United States Patent Office 3,799,957
Patented Mar. 26, 1974

3,799,957
ESTERS OF 10-OXA-2,4-ALKADIENOIC ACIDS
Vaclav Jarolim, Frantisek Sehnal, and Frantisek Sorm, Prague, Czechoslovakia, assignors to Ceskoslovenska Akademie Ved., Prague, Czechoslovakia
No Drawing. Filed July 3, 1972, Ser. No. 268,428
Claims priority, application Czechoslovakia, July 19, 1971, PV 5,303/71
Int. Cl. C07c 69/66; A01n 9/24
U.S. Cl. 260—410.9 R   7 Claims

ABSTRACT OF THE DISCLOSURE

Novel 10-oxa-2,4-alkadienoic acids and esters, preparation thereof and the control of insects.

---

The invention relates to insect control, novel insect control agents, intermediates therefor, and preparation thereof.

Numerous juvenile-hormone-like substances have been recently discovered which stimulate the larval development, inhibit the larval metamorphosis, and are essential for the ovarian growth in adult females.

Compounds the preparation and use of which are claimed in the present patent application, are novel analogues of the insect juvenile hormone, namely, novel esters of 10-oxa-2,4-alkadienoic acids containing 12–15 atoms in their chain and substituted at positions 3, 7, and 11 by alkyl group.

The present invention relates to insect control agents, the active substance of which comprises novel esters of 10-oxa-2,4-alkadienoic acids as well as their cis- and trans-isomers and intermediates, according to Formula I

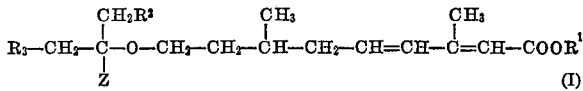

wherein, $R^1$ is a lower alkyl group consisting of 1–6 carbon atoms,
$R^2$ is hydrogen or methyl,
$R^3$ is hydrogen or alkyl group consisting of 1–3 carbon atoms, and
Z is hydrogen or methyl.

Hereinafter, each of $R^1$-$R^3$ and Z is as defined above, unless otherwise specified.

The invention also relates to a process of preparing novel esters of 10-oxa-2,4-alkadienoic acids according to Formula I as well as their isomers and intermediates, which process comprises treating an alcohol according to Formula II

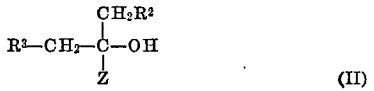

with methyl vinyl ketone of the Formula III $$CH_2=CH-CO-CH_3 \quad (III)$$

thereby forming an alkoxy ketone according to Formula IV

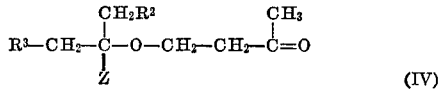

treating the latter alkoxy ketone IV with a dialkyl ester of alkoxycarbonylmethanephosphonic acid according to Formula V $$(Alk-O)_2P(:O)-CH_2-COOR^1 \quad (V)$$

wherein Alk is lower alkyl, thereby forming an ester of an unsaturated alkoxy acid according to Formula VI

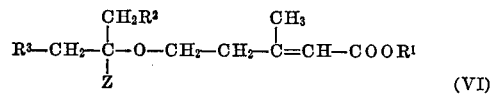

hydrogenating the latter ester VI, thereby forming a saturated ester according to Formula VII

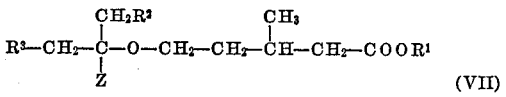

reducing the latter ester VII with complex hydrides, thereby forming an alkoxyalcohol according to Formula VIII

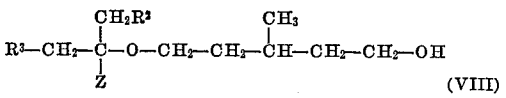

oxidizing the latter alkoxyalcohol VIII, thereby forming an alkoxyaldehyde according to Formula IX

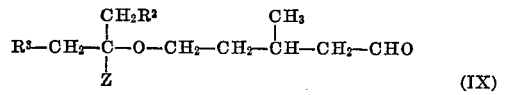

and treating the latter alkoxyaldehyde IX with a dialkyl ester of 3-alkoxycarbonyl-2-methyl-2-propenephosphonic acid according to Formula X

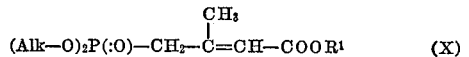

wherein Alk is lower alkyl, thereby forming the final ester of a 10-oxa-2,4-alkadienoic acid according to Formula I.

The advantageous reaction conditions for the individual steps of preparing the novel compounds according to the present invention are the following.

(1) Oxidation of the alcohol according to the general Formula VIII to the corresponding aldehyde is perfomed with chromium trioxide in pyridine.

(2) Reaction of the alkoxyketone according to the general Formula IV with dialkyl esters of an alkoxycarbonylmethanephosphonic acid V and reaction of the alkoxyaldehyde according to the general Formula IX with dialkyl esters of a 3-alkoxycarbonyl-2-methyl-2-propenephosphonic acid X is performed in an inert atmosphere in dimethylformamide or ethylene glycol dimethyl ether in the presence of alkali metal alkoxides or hydrides such as sodium methoxide, sodium ethoxide or sodium hydride.

(3) Reaction products obtained by procedures given in paragraph (2) are separated by absorption chromatography on silica gel or by gas chromatography.

The invention is illustrated by the following examples but is not limited thereto.

EXAMPLE 1

Preparation of methyl 10-oxa-3,7,11,11-tetramethyl-2,4-dodecadienoate (a) 5 - oxa - 6,6,dimethylheptan - 2-one.—Tert-butyl alcohol (30 ml.) and methylvinyl ketone (15 g.) are converted under catalysis of boron trifluoride ethereate (0.1 g.) and red mercuric oxide (0.1 g.) by a known procedure into 5-oxa-6,6-dimethylheptan-2-one (7 g.), B.P. 95–105° C. (bath temperature) at 50 mm. Hg.

(b) Methyl 6 - oxa - 3,7,7, - trimethyl-2-octenoate.—Methanolic sodium methoxide (obtained from 2.25 g. of sodium and 25 ml. of absolute methanol) is added dropwise in a nitrogen atmosphere under cooling with water and stirring to a solution of diethyl methoxycarbonylmethanephosphonate (21.5 g.) in absolute dimethylformamide (150 ml.) and the whole mixture is stirred at room temperature for one hour, 5-oxa-6,6-dimethylheptan-2-one (12 g.) is then added dropwise under cooling with water. The mixture is stirred at room temperature for one hour and then at 70° C. for 4 hours. The reaction mixture is poured onto ice, the alkalinity of the solution is weakened by the addition of acetic acid, and the product is extracted with light petroleum. The extract is washed with aqueous sodium hydrogen carbonate and water, dried, and evaporated. Yield, 7 g. of methyl 6-oxa-3,7,7-trimethyl-2-octenoate, B.P. 135–140° C./27 mm. Hg (bath temperature).

(c) Methyl 6 - oxa - 3,7,7-trimethyloctanoate.— Methyl 6-oxa-3,7,7-trimethyl-2-octenoate (3.7 g.) is hydrogenated in methanol (10 ml.) over 5% palladium on carbon catalyst. When the hydrogenation is finished, the catalyst is filtered off, the filtrate is evaporated, and the residue is distilled at 125° C./25 mm. Hg (bath temperature) to afford 3.4 g. of the title methyl 6-oxa-3,7,7-trimethyloctanoate.

(d) 6 - oxa - 3,7,7-trimethyloctan-1-ol.—Methyl 6-oxa-3,7,7-trimethyloctanoate (3.3 g.) is added dropwise under stirring at room temperature to a suspension of lithium aluminum hydride (0.5 g.) in absolute ether (50 ml.) and the stirring is continued for one hour. The mixture is gently refluxed for 2 hours, cooled down, and the excess reducing agent is decomposed by the addition of acetone and water. The mixture is acidified with dilute hydrochloric acid, the ethereal layer is washed successively with water, aqueous sodium hydrogen carbonate and water again, dried, and evaporated. The crude residue is distilled at 125–130° C./13 mm. Hg (bath temperature) to afford 2.5 g. of 6-oxa-3,7,7-trimethyl-octan-1-ol.

(e) 6-oxa-3,7,7-trimethyloctanal

Chromium trioxide (4.0 g.) is added portionwise under stirring and cooling with ice and water into absolute pyridine (45 ml.). The resulting mixture is treated dropwise at room temperature with a solution of 6-oxa-3,7,7-trimethyloctan-1-ol (2.5 g.) in pyridine (5 ml.), the whole mixture is stirred for 8–10 hours, diluted with water (100 ml.), and extracted with five 30 ml. portions of light petroleum. The extracts are combined, washed successively with 3% aqueous sulfuric acid, water, aqueous sodium hydrogen carbonate, and water, dried, and evaporated. The crude residue (1.3 g.) is distilled at 110–115° C./12 mm. Hg (bath temperature) to afford 6-oxa-3,7,7-trimethyloctanal.

(f) Methyl 10-oxa-3,7,11,11-tetramethyl-2,4-dodecadienoate

Methanolic sodium methoxide (obtained from 0.27 g. of sodium and 3.5 ml. of absolute methanol) is added dropwise in a nitrogen atmosphere under stirring and cooling with water to a solution of diethyl 3-methoxycarbonyl-2-methyl-2-propenephosphonate (3.3 g.) in absolute dimethylformamide (20 ml.) and the resulting mixture is stirred for one hour. 6-oxa-3,7,7-trimethyloctanal (1.25 g.) is then added dropwise at room temperature and the mixture is processed analogously to Example 1b. The crude product (1.1 g.) is chromatographed on silica gel (40 g.) in a mixture of light petroleum and ether (92.8, v./v.) to separate the isomers. Overall yield, 650 mg. The product is distilled at 130–135° C./0.01 mm. Hg (bath temperature).

EXAMPLE 2

Isopropyl alcohol is used in the process of Example 1 (a) in place of t-butyl alcohol to prepare 5-oxa-6-methylheptan-2-one and steps (b)–(f) repeated to yield methyl 10-oxa-3,7,11-trimethyl-2,4-dodecadienoate.

The biological effectivenss of novel compounds according to the present invention was evaluated on the basis of their insect juvenile hormone activity. The test substances were applied to the body surface of freshly moulted last instar larvae of *Dysdercus cingulatus, Pyrrhocoris apterus, Graphosoma italicum, Eurygaster intergriceps, Galleria mellonella*, or pupae of *Tenebrio molitor* and *Leptinotarsa decemlineata* in a standard one-microliter drop of acetone or a mixture of acetone and olive oil (9:1). The effect of the application was evaluated after the subsequent ecdysis according to the degree of preservation of the juvenile structures with molted specimens. The activity is expressed in ID–50 activity units which represent such an amount of the test substance in micrograms per specimen which causes under the above mentioned conditions the formation of intermediates between larvae and adults (with hemipterans) or between pupae and adults (with bugs). The unit activity is thus such an amount of the test substance which leads to the formation of half-imaginal specimens.

TABLE

Insect juvenile hormone activity of methyl 10-oxa-3,7,11,11-tetramethyl-2,4-dodecadienoate in ID–50 units per specimen (topical application)

| Insect: | ID–50 units |
|---|---|
| *Dysdercus cingulatus* | 0.05 |
| *Graphosoma italicum* | 10 |
| *Eurygaster integriceps* | <10 |
| *Galleria mellonella* | <0.1 |
| *Leptinotarsa decemlineata* | 10 |

The novel compounds according to the present invention may be used as contact or food insecticides in various application forms such as sprays, dustings, aerosols and the like on suitable carriers analogously to other known insecticides.

We claim:
1. A compound selected from those of the following Formula I:

$$R^3-CH_2-\underset{\underset{Z}{|}}{\overset{\overset{CH_2R^2}{|}}{C}}-O-CH_2-CH_2-\overset{\overset{CH_3}{|}}{C}H-CH_2-CH=CH-\overset{\overset{CH_3}{|}}{C}=CH-COOR^1 \quad (I)$$

wherein,
  $R^1$ is lower alkyl;
  $R^2$ is hydrogen or methyl;
  $R^3$ is hydrogen or lower alkyl consisting of 1–3 carbon atoms; and
  Z is hydrogen or methyl.

2. A compound according to claim 1 wherein Z is hydrogen.
3. A compound according to claim 2 wherein $R^1$ is lower alkyl of one to three carbon atoms.
4. A compound according to claim 3 wherein each of $R^2$ and $R^3$ is hydrogen.
5. A compound according to claim 1 wherein Z is methyl.
6. A compound according to claim 5 wherein $R^1$ is lower alkyl of one to three carbon atoms.
7. A compound according to claim 6 wherein each of $R^2$ and $R^3$ is hydrogen.

References Cited
UNITED STATES PATENTS
3,624,132  11/1971  Urry _____ 260—473 R

OTHER REFERENCES
Sláma, Insect Juvenile Hormone Analogues, Annual Review of Biochemistry, 40, 1079–1102 (1971).

LEWIS GOTTS, Primary Examiner

D. G. RIVERS, Assistant Examiner

U.S. Cl. X.R.

260—484 R, 594, 602, 615 R; 424—312